Dec. 20, 1938.  P. S. DICKEY  2,141,082

MEASURING AND CONTROLLING SYSTEMS

Filed June 19, 1935  2 Sheets—Sheet 1

FLOW OF FLUID
OUTLET PRESSURE ABOVE CRITICAL PRESSURE

FLOW OF FLUID
OUTLET PRESSURE BELOW CRITICAL PRESSURE

INVENTOR.

PAUL S. DICKEY

BY Raymond D. Jenkins.

ATTORNEY.

Dec. 20, 1938. P. S. DICKEY 2,141,082
MEASURING AND CONTROLLING SYSTEMS
Filed June 19, 1935 2 Sheets-Sheet 2

INVENTOR.
PAUL S. DICKEY
BY Raymond W. Junkins
ATTORNEY

Patented Dec. 20, 1938

2,141,082

UNITED STATES PATENT OFFICE 2,141,082

MEASURING AND CONTROLLING SYSTEMS

Paul S. Dickey, Cleveland, Ohio, assignor to Bailey Meter Company, a corporation of Delaware Application June 19, 1935, Serial No. 27,426

5 Claims. (Cl. 264—14)

This invention relates to a method of and apparatus for measuring and/or controlling the output of power utilizing or transforming devices, such as motors, variable speed couplings, engines, etc.

A further object is to provide speed control of a device wherein a first fluid pressure is produced proportional to the desired speed, a second fluid pressure is produced proportional to the actual speed, and compared against the first fluid pressure, and the speed of the device varied until the actual speed is equal to that desired.

Still another object is to provide a speed control of the device wherein a first fluid pressure is produced proportional to the desired speed, a second fluid pressure is produced proportional to the actual speed; and the speed of the device is controlled in accordance with the difference between the first and second fluid pressures.

A further object is to provide a tachometer wherein a fluid pressure is produced proportional to the output speed of the controlled device and the fluid pressure thus produced utilized as an indication of the speed.

A further object of my invention is to provide a tachometer having ample power for operating relatively rugged measuring and/or control devices.

Further objects will be apparent from the following description and from the drawings in which.

Figure 5:
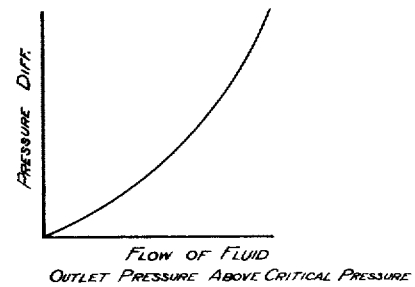
Figure 6:
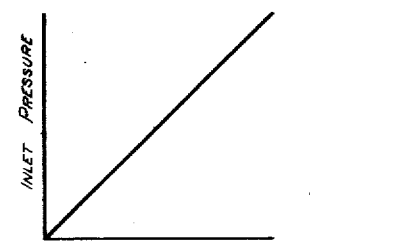
Figure 7:
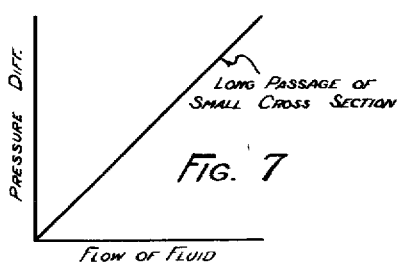

Figs. 5, 6, and 7 are diagrams explaining the performance of different types of restricted aperture arrangements.

Figure 8:
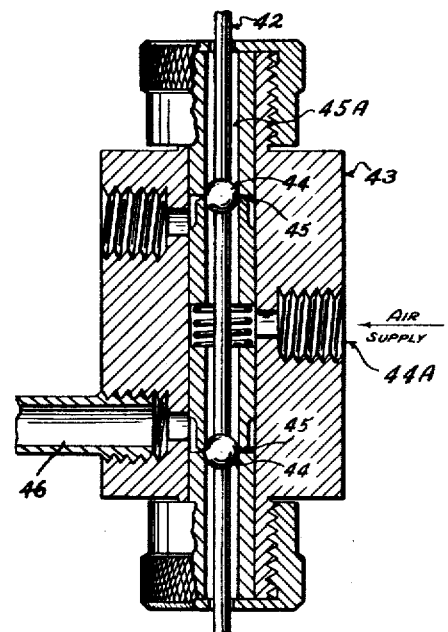

Fig. 8 is a sectional view to an enlarged scale of a pilot valve.

Figure 9:
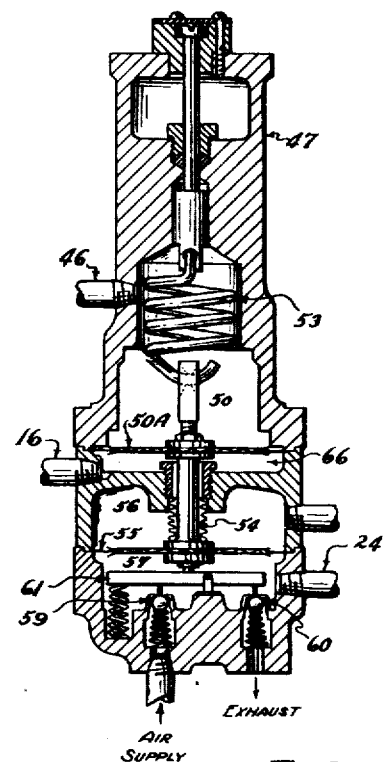

Fig. 9 is a sectional view to an enlarged scale of one form of fluid relay.

Figure 10:
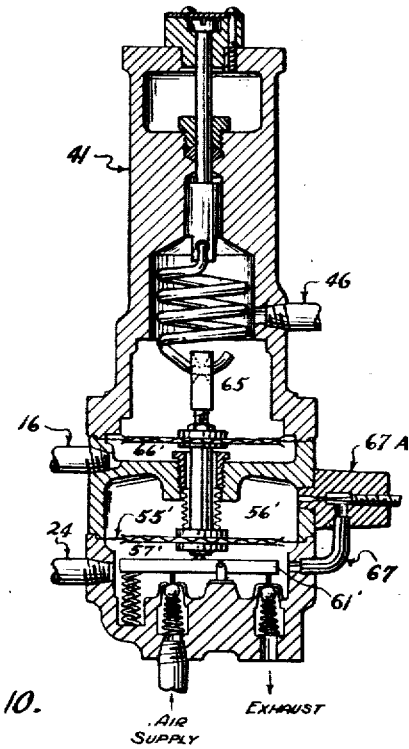

Fig. 10 is a sectional view to an enlarged scale of a standardizing fluid relay.

Figure 1:
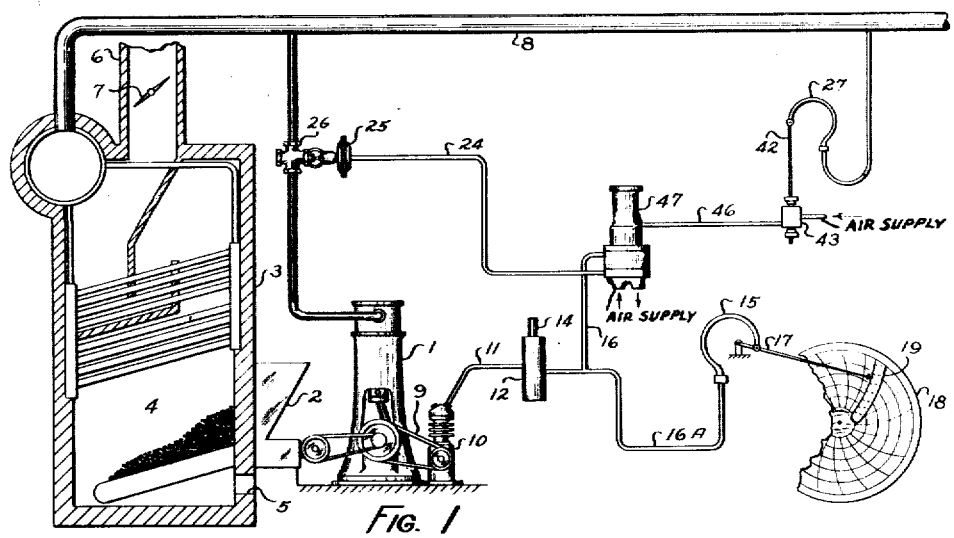
Fig. 1 illustrates diagrammatically a measuring and control system in which my invention is embodied.

Referring to Fig. 1, I have therein shown my invention adapted to indicate, record and control the speed of a vapor engine 1 operating a stoker 2 of a vapor generator 3. Air is supplied to a combustion chamber 4 through an inlet 5 and the gaseous products of combustion are ejected through a stack 6 in which is positioned a damper 7. Vapor passes from the generator through a conduit 8 to a point of usage (not shown).

Driven by the vapor engine 1 through a belt 9 is a fluid pump shown as a positive displacement air compressor 10, the speed of which will accordingly be proportional to the speed of the vapor engine 1. Air is discharged from the compressor 10 through a pipe 11 connecting to a receiver 12. As known, the rate of discharge of air will be proportional to, or vary in functional relation to, the speed of the compressor 10.

Figure 2:
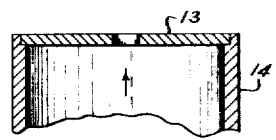
Fig. 2 is a sectional view to an enlarged scale of a restricted aperture arrangement shown in Fig. 1.

Air admitted to the receiver 12 is discharged to the atmosphere through a restricted aperture, such as an orifice 13, located in the extension 14 of the receiver 12 and shown to larger size in Fig. 2.

When the system is in equilibrium it is apparent that the rate of discharge from the receiver will be equal to the rate of admission, and as the flow of air through an aperture varies in functional relation to the pressure differential across the aperture, it follows that the pressure within the receiver 12 will vary in functional relation to the rate of discharge, or to the rate of admission, and accordingly to the speed of the compressor 10 and vapor engine 1. To indicate and/or record the speed of the vapor engine 1, I therefore provide a pressure sensitive device, such as a Bourdon tube 15, connected to a pressure transmitting pipe 16 from the receiver 12 by a pipe or capillary 16A. Actuated by the Bourdon tube 15 is an arm 17 cooperating with a time rotatable chart 18 and index 19 to give a time record and an indication respectively of the speed of the vapor engine 1. The chart 18 may be graduated in any desired units, such as "feet per minute", "R. P. M.", or the like.

In some applications it is desirable that the pressure within the receiver 12 vary in direct proportion to the speed of the compressor 10, or in other words that a straight line relation exists between the pressure within the receiver 12 and the speed of the vapor engine 1, as the chart 18 and index 19 may be uniformly graduated and it further indicates the control of the speed of the vapor engine 1. As known, the flow of fluid through an orifice or other pressure differential producing device from a region of higher pressure into a region of lower pressure varies as the square root of the pressure differential unless the pressure existing in the region of lower pressure is below the critical pressure for the then existing higher pressure. In the latter case the flow through the orifice will vary in direct proportion to the pressure in the region of higher pressure and will be independent of variations of pressure in the region of lower pressure, as first deduced by Napier. To further illustrate the difference, I have shown in Fig. 5 the relation existing between flow and pressure differential when the outlet pressure is above the critical pressure, and in Fig. 6 when it is below the critical pressure. As stated, when the outlet pressure is below the critical pressure no relation exists between pressure differential and flow, the flow varying in direct proportion to the inlet pressure.

By proper design of the orifice 13 I may maintain the fluid pressure within the receiver 12 sufficiently high throughout the operating range of the apparatus so that the pressure of the atmosphere will be below the critical pressure. For example, I may design the orifice 13 so that at the minimum operating speed of the vapor engine a pressure of approximately 13 lb. per square inch gage will exist in the receiver 12. Thereafter as the speed of the vapor engine 1 increases the pressure within the receiver 12 will increase in direct proportion thereto.

Figure 3:
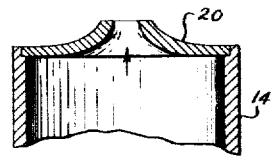
Fig. 3 is a sectional view to an enlarged scale of another form of restricted aperture arrangement.

In Fig. 3 I have shown a second form of a restricted aperture comprising a flow nozzle 20, which I may find desirable to employ in some cases. In general, the relation existing between differential pressure and flow through a nozzle is the same as for an orifice, and further when the discharge or outlet pressure is below the critical pressure for the existing inlet pressure, the flow through the nozzle will vary in direct proportion to the inlet pressure.

Figure 4:
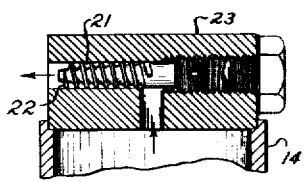
Fig. 4 is a sectional view to an enlarged scale of an adjustable restricted aperture arrangement.

In Fig. 4 I have shown a restricted aperture arrangement wherein the rate of fluid discharge will vary in straight line relation with the pressure differential regardless of the fact that the outlet pressure may be above the critical pressure for the existing inlet pressure, or regardless of whether a compressible or non-compressible pressure transmitting fluid is used. The restriction comprises a capillary channel 21 formed by the spiral thread of the screw 22 adjustably positioned in the block 23. The flow of fluid through a capillary restriction such as I have shown is commonly termed "viscous flow" and the rate of flow of fluid regardless of whether it be compressible or non-compressible will be in direct proportion to the pressure differential across the restriction. By employing the capillary restriction shown in Fig. 4 I may therefore produce a fluid pressure within the receiver 12 bearing a straight line relation to the speed of the vapor engine 1 regardless of whether the discharge pressure at the outlet of the restriction is above or below the critical pressure, or regardless of whether a compressible or non-compressible fluid is employed.

The fluid pressure established in the receiver 12 may be utilized to control the flow of vapor to the engine 1 to maintain its speed at a predetermined or desired value. In one form this is accomplished by transmitting fluid pressure within the chamber 12 through the pipe 16 to a chamber 66 of a relay 47. The relay 47 may be similar to that shown and described in my copending application, Serial No. 8023, filed in the United States Patent Office on February 25, 1935, and shown to larger size in Fig. 11.

Pressures established in the chamber 66 are balanced against pressures established in a relay chamber 57 through the agency of opposed diaphragms 50A and 55 operatively connected by a movable member 54. Fluid pressure is admitted to chamber 57 from any suitable source. Admission and discharge of pressure fluid from the chamber 57 is controlled by a fulcrumed valve member 61, operating a fluid supply valve 59 and an exhaust valve 60. The arrangement is such that upon an increase in pressure within the chamber 66 in response to an increase in speed of the vapor engine 1, the member 54 moves upwardly opening the exhaust valve 60 until the pressure within the chamber 57 is decreased in proportion to the increase in pressure within the chamber 66, when the member 54 will be positioned to the neutral position and valves 59 and 60 closed. The pressure, and accordingly the speed of the vapor engine 1 at which the member 54 will be in the neutral position, may be varied as desired through the agency of an adjustable spring 53 effective for producing a force upon the diaphragm 50A.

Fluid pressures established within the chamber 57 are transmitted through a pipe 24 to a diaphragm motor 25 of a regulating valve 26. The valve 26 is arranged to decrease the rate of flow of vapor to the engine 1 with decreasing pressures within the diaphragm motor 25.

In operation, upon an increase in speed of the vapor engine 1 above that desired for example, the pressure within the receiver 12 will increase, effecting a corresponding decrease in pressure within the chamber 57. This decrease in pressure transmitted to the diaphragm motor 25 will effect a proportionate positioning of the valve 26 in a closing direction, thus decreasing the rate of flow of vapor to the engine 1 and tending to restore the speed of the engine to the desired value. Conversely, upon a decrease in speed below that desired, the fluid pressure within the receiver 12 will decrease effecting a proportionate increase in pressure within the chamber 57, which will be effective to position the valve 26 in an opening direction, thus tending to increase the speed of the engine to the desired value. It is apparent that by proper adjustment of the spring 53 the engine may be maintained at any desired speed, thus producing any desired rate of vapor output from the boiler 3.

My invention further contemplates the establishment of a fluid pressure in accordance with a desired rate of speed and then controlling the speed in accordance with the difference between the actual and the desired speed. For example, it is frequently desirable to control the stoker speed of a vapor generator to maintain a predetermined or desired vapor pressure. Accordingly in Fig. 1 I show a Bourdon tube 27 sensitive to variations in steam pressure and adapted to position a movable valve member 42 of a pilot valve 43, shown to larger size in Fig. 10. The pilot valve 43 shown in cross section may be of the type forming the subject matter of an application of Clarence Johnson, Serial No. 673,212 filed in the United States Patent Office May 27, 1933, now Patent No. 2,054,464. The movable valve member 42 extends longitudinally through a passageway 45A and is provided with lands 44 of slightly less diameter than the passageway 45A. Fluid pressure admitted to the passageway 45A through the inlet 44A from any suitable source escapes past the lands 44 to the atmosphere and produces a pressure gradient across each land 44. Adjacent each land 44 is a thin outlet port 45 and it is apparent that the pressure existing at the outlet port will depend upon the position of the movable valve member 42. As I prefer to establish a fluid pressure varying inversely with variations in fluid pressure, I transmit the pressure existing at the lower outlet port 45 through a pipe 46 to a chamber 50 of the relay 47.

An increase in vapor pressure above that desired will effect a decrease in pressure within the chamber 50 which will effect a proportionate decrease in pressure within the chamber 57, producing a positioning of the valve 26 in a closing direction decreasing the speed of the vapor engine 1 and stoker 2, decreasing the rate of fuel admission and accordingly the rate of vapor production, tending to restore the vapor pressure to the desired value. It is apparent that upon a decrease in vapor pressure below that desired the converse will take place, the valve 26 being positioned in an opening direction, increasing the rate of fuel admission and thus tending to increase the vapor pressure to the desired value.

When, however, the speed of the engine decreases, the pressure within the receiver 12 and chamber 66 of the relay 47 will decrease, thus acting in opposition to the pressure established within the chamber 50 by the pilot 43. In general, it may therefore be said that the pilot 43 establishes a fluid pressure in accordance with the desired rate of speed of the vapor engine 1, that the compressor 10 and receiver 12 establishes a fluid pressure in accordance with the actual speed of the engine and that the relay 47 controls the rate of vapor flow to the engine in accordance with the difference in the fluid pressures.

In Fig. 12 I have illustrated a standardizing application of Harvard H. Gorrie, Serial No. 8047, filed in the United States Patent Office February 25, 1935, now Patent No. 2,098,914, which I may use in the control system shown in Fig. 1 in place of the relay 47. As with the latter, fluid pressures established by the pilot 43 are admitted to a chamber 65 and are effective for balancing pressures established in the relay chamber 57'. Likewise pressures established in the receiver 12 are transmitted through the pipe 16 to a chamber 66' and act against the pressure in the chamber 65.

In communication with the chamber 57' through a pipe 67, and throttling valve 67A, is a chamber 56'. Pressures in this chamber act against the pressures in chamber 57' and, as evident, for the valve member 61' to be in equilibrium must be equal to or in desired predetermined proportion to each other. The pressure in the chamber 56' serves to render ineffective the pressure in the chamber 57' against the diaphragm 55', so that the sole pressures effective for establishing a state of equilibrium are those in chambers 65 and 66'. As with the relay 47, the relay 41 acts to produce an immediate change in fluid pressure transmitted to the diaphragm motor 25 proportional to changes in the difference in pressures in chambers 65 and 66'; but thereafter due to the restricted communication between the chambers 56' and 57' the fluid pressure transmitted to the diaphragm motor will continue to change in the same sense until the difference in pressures in chambers 65 and 66' is restored to the original or predetermined difference.

A reference to specific values may aid in understanding the modified action of the relay 41 over the relay 47. Referring to relay 47, if the pressure in chamber 50 increases five pounds there will be a corresponding immediate pressure change in chamber 57 of five pounds. Thereafter as the speed of the vapor engine 1 changes as a result of such change, the pressure in chamber 66 will vary accordingly, effecting a change in pressure within the chamber 57 in opposite sense to the original change, producing a corresponding further secondary positioning of the valve 26.

By modifying the area of the diaphragm 50A relative to the area of the diaphragm 55, I may produce a primary change of say 10 lb. in chamber 57 for the 5 lb. change in chamber 50, but the secondary change then will be in opposite direction. In general, therefore, the action of the relay 47 is to produce an immediate and relatively large change in rate of vapor flow to the engine proportional to changes in the vapor pressure within the conduit 8, and thereafter to produce a further change in the rate of vapor flow in opposite sense, and proportional to the change in speed of the engine. By proper proportioning of the diaphragms 50A and 55, the relay 47 will serve to cause an immediate and large change in the rate of fuel supply to the vapor generator in excess of that required to restore the vapor pressure to the desired value and thereafter to gradually decrease the rate of fuel supply so that the vapor pressure does not overshoot and a hunting condition result.

Referring to relay 41, upon a 5 lb. change in pressure within the chamber 65 an immediate equal or proportional change will be produced in chamber 57'. Thereafter as the speed of the engine changes, the pressure in chamber 66' will change, tending to effect a change in pressure in chamber 57' in opposite sense. Simultaneously the changing pressure in chamber 56' will serve to effect a further change in pressure in chamber 57' in the original sense. If the pressure in chamber 66' changes more rapidly than the pressure in chamber 56' the change in pressure in chamber 57' will be in the opposite sense, and if slower, in the original sense. In practice it is usually preferable that changes in pressure in chamber 56' proceed slower than changes in pressure in the chamber 66', so that broadly speaking the action of the device is first to produce a change in the fuel supply to the controlled device, then to determine the effect of that change upon the output of the controlled device, then to produce a further change in the fuel supply and ad infinitum until for a desired output, that output is actually obtained. That the action once initiated will continue until such a condition results is evident by the fact that the pressure in chamber 56' will eventually equal and counterbalance the effect of pressure in the chamber 57' on the diaphragm 55'. Thus the sole forces establishing a state of equilibrium are due to the pressures in chambers 65 and 66', the difference between which must be restored to the original or predetermined value for the state of equilibrium to be established. The relay 41 therefore acts to produce an initial or primary change in the rate of fuel supply in proportion to the changes in the controlled condition and thereafter to produce a continuing change until the condition is restored to the predetermined or desired value.

Certain subject matter of my invention disclosed but not claimed herein is disclosed and claimed in my co-pending divisional application, Serial No. 240,467, filed November 15, 1938.

It will be understood that by describing and illustrating certain embodiments of my invention I am not to be limited thereby except as to the claims appended hereinafter in view of the prior art.

What I claim as new and desire to secure by Letters Patent of the United States, is:

1. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber, means for producing initial changes in the rate of vapor supply to said engine proportional to changes in pressure within said chamber, and means for producing continuing changes in the rate of vapor supply in accordance with the deviation of the pressure in said chamber from a predetermined value of pressure in said chamber.

2. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber, means for producing initial changes in the rate of vapor supply to said engine proportional to changes in pressure within said chamber, and means including at least a part of said last named means for producing continuing changes in the rate of vapor supply in accordance with the deviation of the pressure in said chamber from a predetermined value of pressure in said chamber.

3. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber; a fluid pressure relay comprising a first and a second chamber separated by a first pressure sensitive diaphragm, a third and a fourth chamber separated by a second pressure sensitive diaphragm, a restricted connection between said third and fourth chambers, valve means for admitting and discharging fluid into said fourth chamber, and a member connected to said diaphragms for operating said valve means; a pressure transmitting connection between said first named chamber and said second chamber, and regulating means of the vapor supplied under the control of the fluid pressure in said fourth chamber.

4. In combination, an engine having a rotatable output shaft, means for supplying vapor to said engine, a positive displacement fluid compressor driven by said shaft, a chamber into which said compressor discharges and means for controlling the speed of said output shaft comprising, means for establishing a first fluid pressure in accordance with the desired speed, means for producing changes in a second fluid pressure in accordance with changes in the difference in said first fluid pressure and the pressure in said chamber, means for producing changes in said second fluid pressure in accordance with the departure of said difference from a predetermined difference, and control means for said vapor supply means under the control of said second fluid pressure.

5. In combination, an engine having a rotatable output shaft, means for supplying vapor to said engine, a positive displacement fluid compressor driven by said shaft, a chamber into which said compressor discharges and means for controlling the speed of said output shaft comprising, means for establishing a first fluid pressure in accordance with the desired speed, means for producing changes in a second fluid pressure in accordance with changes in the difference between said first fluid pressure and the pressure in said chamber, means including at least a part of said last named means for producing changes in said second fluid pressure in accordance with the departure of said difference from a predetermined difference, and control means for said vapor supply means under the control of said second fluid pressure.

PAUL S. DICKEY.

---

CERTIFICATE OF CORRECTION.

Patent No. 2,141,082. December 20, 1938.

PAUL S. DICKEY.

It is hereby certified that error appears in the printed specification of the above numbered patent requiring correction as follows: Page 3, first column, line 35, after the word "standardizing" insert relay 41 such as forms the subject matter of an; and that the said Letters Patent should be read with this correction therein that the same may conform to the record of the case in the Patent Office.

Signed and sealed this 21st day of March, A. D. 1939.

Henry Van Arsdale.

(Seal)

Acting Commissioner of Patents.

claims appended hereinafter in view of the prior art.

What I claim as new and desire to secure by Letters Patent of the United States, is:

1. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber, means for producing initial changes in the rate of vapor supply to said engine proportional to changes in pressure within said chamber, and means for producing continuing changes in the rate of vapor supply in accordance with the deviation of the pressure in said chamber from a predetermined value of pressure in said chamber.

2. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber, means for producing initial changes in the rate of vapor supply to said engine proportional to changes in pressure within said chamber, and means including at least a part of said last named means for producing continuing changes in the rate of vapor supply in accordance with the deviation of the pressure in said chamber from a predetermined value of pressure in said chamber.

3. In combination, an engine having a rotatable output shaft, means for supplying vapor to said engine, a positive displacement fluid compressor driven by said shaft, a chamber into which said compressor discharges having a restricted opening into a region below the critical pressure for the pressure existing within the chamber; a fluid pressure relay comprising a first and a second chamber separated by a first pressure sensitive diaphragm, a third and a fourth chamber separated by a second pressure sensitive diaphragm, a restricted connection between said third and fourth chambers, valve means for admitting and discharging fluid into said fourth chamber, and a member connected to said diaphragms for operating said valve means; a pressure transmitting connection between said first named chamber and said second chamber, and regulating means of the vapor supplied under the control of the fluid pressure in said fourth chamber.

4. In combination, an engine having a rotatable output shaft, means for supplying vapor to said engine, a positive displacement fluid compressor driven by said shaft, a chamber into which said compressor discharges and means for controlling the speed of said output shaft comprising, means for establishing a first fluid pressure in accordance with the desired speed, means for producing changes in a second fluid pressure in accordance with changes in the difference in said first fluid pressure and the pressure in said chamber, means for producing changes in said second fluid pressure in accordance with the departure of said difference from a predetermined difference, and control means for said vapor supply means under the control of said second fluid pressure.

5. In combination, an engine having a rotatable output shaft, means for supplying vapor to said engine, a positive displacement fluid compressor driven by said shaft, a chamber into which said compressor discharges and means for controlling the speed of said output shaft comprising, means for establishing a first fluid pressure in accordance with the desired speed, means for producing changes in a second fluid pressure in accordance with changes in the difference between said first fluid pressure and the pressure in said chamber, means including at least a part of said last named means for producing changes in said second fluid pressure in accordance with the departure of said difference from a predetermined difference, and control means for said vapor supply means under the control of said second fluid pressure.

PAUL S. DICKEY.

CERTIFICATE OF CORRECTION.

Patent No. 2,141,082. December 20, 1938.

PAUL S. DICKEY.

It is hereby certified that error appears in the printed specification of the above numbered patent requiring correction as follows: Page 3, first column, line 35, after the word "standardizing" insert relay 41 such as forms the subject matter of an; and that the said Letters Patent should be read with this correction therein that the same may conform to the record of the case in the Patent Office.

Signed and sealed this 21st day of March, A. D. 1939.

Henry Van Arsdale.

(Seal)

Acting Commissioner of Patents.